Sept. 5, 1961 S. B. JONES ET AL 2,999,204
METHOD AND MEANS FOR REDUCING INHOMOGENEITIES
IN NUCLEAR MAGNETISM WELL LOGGING
Filed Nov. 22, 1957 3 Sheets-Sheet 2

INVENTORS
STANLEY B. JONES
ROBERT J. S. BROWN
BY
ATTORNEYS

Sept. 5, 1961 S. B. JONES ET AL 2,999,204
METHOD AND MEANS FOR REDUCING INHOMOGENEITIES
IN NUCLEAR MAGNETISM WELL LOGGING
Filed Nov. 22, 1957 3 Sheets-Sheet 3

INVENTORS
STANLEY B. JONES
ROBERT J. S. BROWN
BY
ATTORNEYS

United States Patent Office 2,999,204
Patented Sept. 5, 1961

2,999,204
METHOD AND MEANS FOR REDUCING INHOMO-
GENEITIES IN NUCLEAR MAGNETISM WELL
LOGGING
Stanley B. Jones, Whittier, and Robert J. S. Brown, Ful-
lerton, Calif., assignors to California Research Corpora-
tion, San Francisco, Calif., a corporation of Delaware
Filed Nov. 22, 1957, Ser. No. 698,108
18 Claims. (Cl. 324—.5)

This invention relates to nuclear magnetism well log-
ging and more particularly to a method for reducing the
effect of magnetic field inhomogeneities on spin mag-
netic induction signals derived from the precession of
polarized atomic particles having spin magnetic moments
and located in an earth formation traversed by a well
bore where said signals are used to identify a character-
istic of the earth formation, such as the liquids therein.

Reference should be had to the following co-pending
applications defining the techniques used in spin magnetic
induction well logging:

Ser. No. 461,339 filed Oct. 11, 1954, P. E. Baker et al.;
Ser. No. 531,243 filed Aug. 29, 1955, S. B. Jones et al.;
Ser. No. 543,967 filed Oct. 31, 1955, R. J. S. Brown;
Ser. No. 562,229 filed Jan. 30, 1956, R. J. S. Brown et al.

In these copending applications, each assigned to the
assignee of the present invention, the art of spin magnetic
induction well logging is presented with the phenomenon
being observed having an explainable analogy by com-
parison to the action of a gyroscope when subjected to a
force tending to tip its axis of rotation. The analogy to
a gyroscope becomes strained when compared to the
action of a single atom or the proton of an atom in that
many forces and effects are acting upon the atom in its
association with other atoms. In actuality, precession
is a quantum mechanical process that can be described
in terms of probabilities or expectation values and, in
this respect, a statistically significant group of atoms or
protons can be considered as a classical precessing and
magnetized gyroscope. Throughout this specification
reference will be made to atoms, atomic particles and
protons in a general sense with each term, except where
obviously impossible, intended to include the others.
In the art of well logging it is expected that the best spin
magnetic induction signals will be obtained from the nu-
clei of atoms in situ because of certain space and power
limitations placed on the actual apparatus to be employed;
however, the reference to the action of protons in the
processes to be described is not intended to exclude the
action of other atomic particles and is intended to be
merely an exemplification within the processes defined.
The most desirable signals to be detected will be the sig-
nals from the protons within the nucleus of hydrogen
atoms in the fluids, particularly oil and water, within the
earth formations penetrated by a well bore.

In the techniques established by the above copending
applications, atomic particles of an earth formation trav-
ersed by a well bore are polarized in a magnetic field
generated by current flow through a coiled electrical
conductor. After the polarizing field has been removed,
and after any subsequent relaxation field has been re-
moved, it is desirable that the protons aligned by the
polarization and relaxation fields be subjected to a preces-
sion field that is, ideally, spatially uniform. By spatially
uniform is meant that the precession field in the earth
formation containing the protons contributing to the spin
magnetic induction signals will be uniform in strength
and be parallel at all points in the vicinity of the detec-
tor employed to receive the signals of precession. The
uniformity of this field is important to the measurement
of spin magnetic induction signals because of the rela-
tionship of frequency of precession and precession field
strength wherein the frequency of precession of a polar-
ized proton is proportional to the strength of the field
in which it is precessing. If the precession field is non-
uniform the rate of precession for all protons within a
randomly distributed group around the well bore will
not be the same throughout the earth formation being
logged and the rate of precession is different for certain
of the protons, then the protons within the group will
soon get out of phase with each other and become so
randomly out of phase in their precession that there will
be no cumulative signal as there would be if all protons
were precessing at the same rate with individual signals
reinforcing each other in the detector to produce a sig-
nal of observable strength. Summarizing the foregoing
then, if the precession field is nonuniform, the spin mag-
netic induction signal will be weakened and may even be
canceled.

There are several probable causes of the nonuniform-
ity in the precession field employed to produce the spin
magnetic induction logging signal. Of these several
causes only two are considered important enough to have
a serious effect on the homogeneity of the precession
field. Both causes are based on the probability of mag-
netizable material in the vicinity of the volume of forma-
tion producing the desired spin magnetic induction sig-
nals, with one cause being the magnetizable material in
the earth formation and the other being the magnetizable
material in the drilling fluid.

The first of these materials, the naturally occurring,
magnetically retentive material in the earth formation
being logged, will be magnetized nonuniformly by the
strong polarizing field in the initial operation of polariz-
ing the atomic particles within the formation. The polar-
izing field will be unavoidably nonuniform because of
the apparatus used to establish the field and of the po-
sition of the atomic particles with respect to the field-
establishing apparatus. This is an inherent character-
istic of a magnetic field created by an electromagnetic
coil wherein the field strength may be uniform within
the core of the coil but must, of necessity, establish a
fanning nonuniformity as the flux lines leave the core and
pass around to re-enter the core at the other side of the
coil.

After the polarizing field has been terminated, the rem-
nant magnetism established in the magnetization of the
magnetically retentive material of the formation will
persist to produce its own magnetic field at some greatly
reduced strength but substantially in the direction of
the initial polarization field. This, then, will mean that
the formation will retain a pattern of magnetization in
the same fanning configuration as was created by the
strong polarizing field.

The second cause of the field nonuniformity is the mag-
netically retentive materials in the drilling fluids within
the well bore. These magnetically retentive materials
may be either intentionally placed within the drilling
fluid for the poisoning purposes as defined in the afore-
mentioned copending applications, or may be in the
fluid through unavoidable circumstances being chipped
or abrasively removed from the drill bit or drill stem in
the drilling of the well bore through the earth forma-
tion. The drilling fluid will constitute the material
within the core of the polarizing coil and will surround
the coil in its position within the well bore so that, be-
cause of this proximity to the coil, it will be subjected
to the most intense polarization available from the po-
larizing coil. The magnetically retentive material within
the core of the polarizing coil will therefore have the
probability of producing a relatively large remnant mag-
netic field persisting after the polarizing field has been
terminated and this remnant field will have flux lines in the same fanning configuration as was initially produced by the polarizing field even though of much weaker strength. The effect of the retained magnetic field of the magnetizable material within the drilling fluid will extend outside of the bore hole itself and into the formation such that the field thus produced will be directionally identical, or at least very similar to, the polarizing field reinforcing the previously described nonuniformity established by the magnetically retentive materials in the formation.

The nonuniform field arising from the abovementioned causes will be called the extraneous remnant field with the adjective "extraneous" intended to distinguish it unambiguously from fields such as the earth's field remaining in the formation after the polarizing field has been terminated; the earth's field being, usually, a substantially uniform field.

Whatever may be the cause of the extraneous remnant field, its existence is inherent due to the position of the source of the polarizing field, and its effects should be reduced to improve the quality of the spin magnetic induction signals derived from the atomic particles within the formation. The remnant field, when superimposed upon the desired uniform precession field established by the earth's magnetic field, causes the resultant precession field to be nonuniform throughout the formation so that selected protons are acted upon by precession fields of different strength, causing their frequency of precession to be different and their signals, rather than reinforcing each other, to become out of phase rapidly to reduce the vectorial summation of the spin magnetic induction signals to a strength below a level of detection. The nonuniformity of the precession field does not affect the time of precession of the individual protons to make this time so short that the individual precession of a single proton could not be detected, nor does it reduce the strength of any single precession signal; however, because the signal derived from any one proton may soon become out of phase with the signal from another proton, the vectorial summation of all signals soon becomes so small that it cannot be detected and, while this out-of-phase condition may be cyclically temporary for a few selected protons, the total effect over the infinitely large whole results in an undetectable signal.

The solution to the problem defined in the foregoing paragraphs becomes evident from the understanding of the source of the extraneous remnant field. The field nonuniformity is established by the field persisting after polarization caused by the magnetization of naturally occurring magnetizable materials; the elimination of this nonuniformity may then be accomplished by providing a field of equal and opposite intensity in the volume from which spin magnetic induction signals are to be derived. If the oppositely polarized field is created electromagnetically and if the source of the field is the same or in the same position as the source of the polarizing field, then its pattern will be substantially the same throughout the formation as was the pattern established by the polarizing field. The provision of such a field can therefore substantially eliminate the extraneous remnant field by establishing a field of equal strength and opposite polarity to that remaining after the polarizing field has been terminated.

The strength of this opposite or compensating field may be determined through successive trials or may be calculated from observations of the envelope characteristics of the spin magnetic induction signals derived from the formation after the application of a compensating magnetic field of preselected strength.

It is, therefore, an object of the present invention to provide an improved method for operating a nuclear magnetic resonance well logging tool.

A further object of the present invention is a provision of a method and apparatus for deriving spin magnetic induction signals from atomic particles in an earth formation polarized by a spatially nonuniform polarizing field.

A further object of the present invention is to provide a method and apparatus for eliminating field inhomogeneities in an earth formation traversed by a well bore having been previously subjected to a spatially nonuniform polarizing field.

A further object of the present invention in accordance with the preceding object is a method for determining the magnetic strength of a compensating field that is required to substantially eliminate the inhomogeneities in a precession field for polarized atomic particles caused by extraneous remnant fields within the formation and/or the well bore.

Other objects and features of the invention will be readily apparent to those skilled in the art from the specification and appended drawings illustrating certain preferred embodiments in which:

FIG. 5b illustrates an energization curve for a compensating field coil for developing the signal of FIG. 5a.

Figures 1, 2A, 2B, 2C:
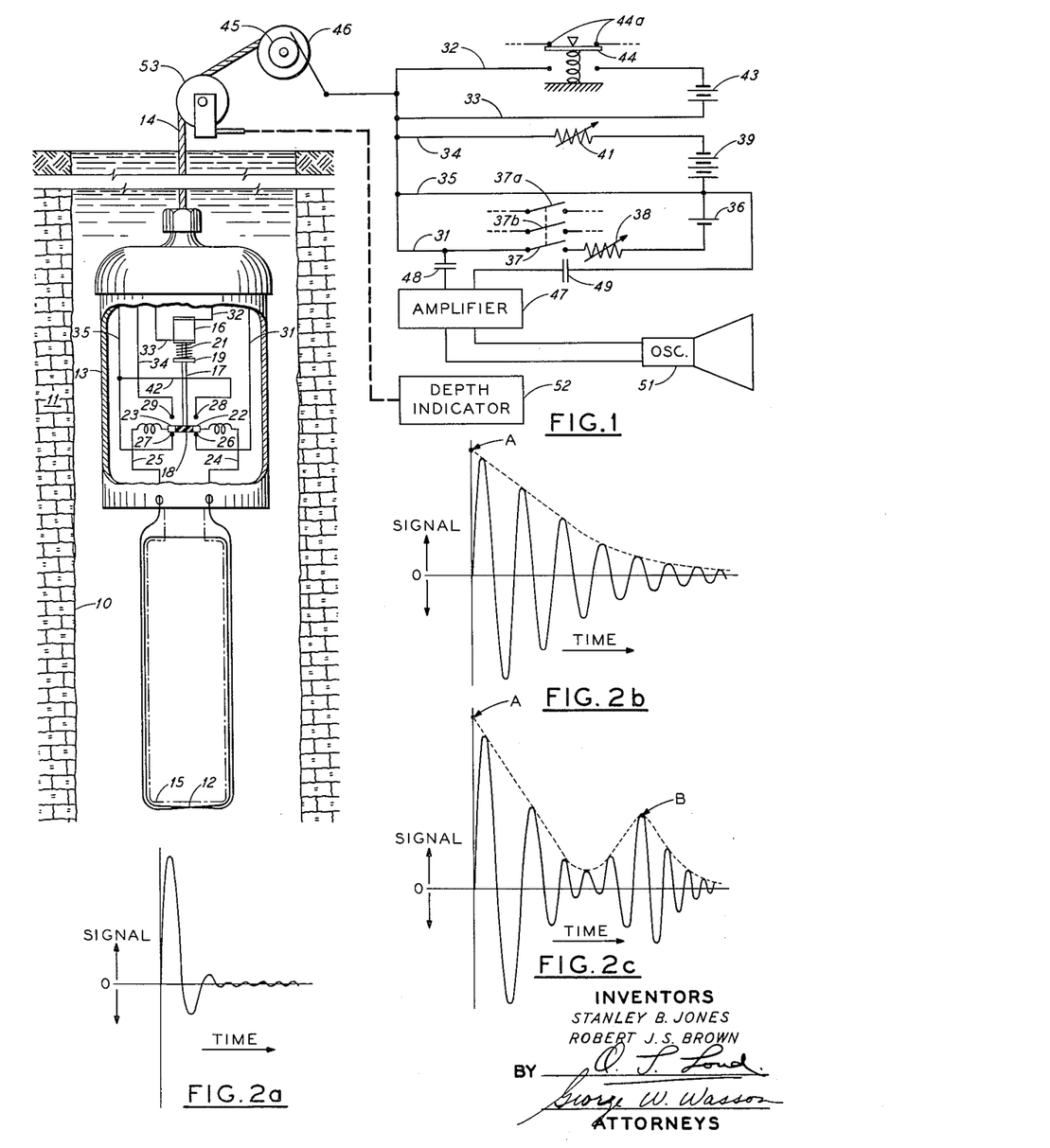
FIG. 1 is a schematic representation of a spin magnetic induction logging tool adapted to carry out the methods of the present invention.
FIG. 2a is a spin magnetic induction signal, in chart form, derived from precessing protons acted upon by an inhomogeneous precession field.
FIG. 2b is a spin magnetic induction signal, in chart form, derived from protons precessing in a substantially uniform precession field.
FIG. 2c is a spin magnetic induction signal, in chart form, derived from protons precessing in an overcompensated precession field.

FIG. 1 illustrates one form of apparatus for performing the method of the present invention. As illustrated in this figure, the spin magnetic induction well logging measurements are made on a portion of the earth formations lying along a well bore 10 traversing an earth formation 11. In the performance of this method, a coil 12 is supported by and external to a substantially nonmagnetic logging sonde 13 suspended on a cable 14 from the earth's surface. The logging sonde 13 supports a nonmagnetic form 15 for the coil 12 and houses a switching mechanism for the energization of the coil 12 so that the single coil may be used, as will be hereinafter explained, for polarizing the earth formation 11, for compensating for the effects of extraneous remnant magnetic fields and for detecting the desired spin magnetic induction signals.

The switching mechanism within the sonde 13 constitutes a solenoid 16 having an operating shaft 17 provided with an insulated contact carrier 18 and a flange 19. A spring 21 operates between the flange 19 and the body of the solenoid 16 to bias the contact carrier 18 into the nonenergized position as shown in FIG. 1. Contact carrier 18 is provided at the ends thereof with a pair of contacts 22 and 23 connected by conductors 24 and 25, respectively, to the terminals (not shown) of the coil 12. Four stationary contacts 26, 27, 28 and 29 are provided for the solenoid 16 with the contacts 22 and 23 in engagement with contacts 26 and 27 in the normally unenergized position for the solenoid. The contact carrier 18 is adapted to carry the contacts 22 and 23 into engagement with contacts 28 and 29 upon energization of solenoid 16.

Cable 14 provides not only support for the sonde 13 within the well bore 10 but also encases conductors 31, 32, 33, 34 and 35, carrying the energization and control for the logging sonde from the uphole components of the apparatus at the earth's surface. Conductors 31 and 35 are connected in the logging sonde 13 to the contacts 26 and 27, respectively, and in the uphole components to a power source constituting a battery 36; with conductor 35 connected directly to one terminal of the battery 36 and conductor 31 connected to the other terminal of the battery through a switch 37 with blades 37a and 37b, having operations to be hereinafter defined, and an adjustable resistor 38. Conductor 34 is connected downhole to terminal 29 of the solenoid 16 and uphole to a terminal of a second battery 39 through an adjustable resistor 41. In addition to being connected to battery 36, conductor 35 is connected to a terminal of the battery 39 in the uphole components of the apparatus and, within the sonde 13, to terminal 28 of the solenoid 16 by conductor 42. Conductors 32 and 33 are connected to the solenoid 16 in the downhole components and, uphole, to a battery 43 with conductor 32 being connected to the battery 43 through a switch 44 having contacts 44a for a purpose to be hereinafter defined. The interconnection between the uphole and downhole sections of the conductor 31 through 35 is provided by a slip ring 45 on the cable drum 46 about which cable 14 is wound in raising and lowering the sonde 13 in the well bore 10.

In addition to the control circuitry just described, the uphole components of the apparatus for performing the methods of the present invention also include an amplifier 47, an oscilloscope 51 and a depth indicator 52. The amplifier is connected to the coil 12 through blocking capacitors 48 and 49 in conductors 31 and 35, respectively, the oscilloscope 51 is driven by the amplifier 47 and may be either an electron-gun type oscilloscope, as shown, or an oscillograph for producing a permanent record of its energization, and the depth indicator is mechanically connected to pulley 53 driven by the cable 14 as the sonde is raised and lowered in the well bore.

The operation of the logging sonde as illustrated in FIG. 1 in the performance of the methods of the present invention will now be described. In the preliminary remarks concerning the purpose of the present invention and through the reference to the aforementioned copending applications, it should be apparent that the coil 12 will be energized to polarize the atomic particles within the earth formations 11 traversed by the well bore 10. In the performance of this polarization function the solenoid 16 will be energized through the contacts of switch 44 to raise the contact carrier 18 thus engaging contacts 22 and 23 with contacts 28 and 29, respectively. Coil 12 will then be connected to the battery 39 to provide energization current as adjusted by resistor 41 to polarize the atomic particles within the earth formation 11. The period for energization of the coil 12 will be previously determined, as is explained in the aforementioned copending applications, to provide for the proper polarization of the atomic particles within the earth formations being investigated. When switch 44 is opened, solenoid 16 will be de-energized to disconnect contacts 22 and 23 from contacts 28 and 29, thus terminating the polarization current to the coil 12, and, under the bias of spring 21, the contacts 22 and 23 will be carried into engagement with contacts 26 and 27 to connect the coil 12 to conductors 31 and 35. In this position the coil 12 is connected through capacitors 48 and 49 to the amplifier 47 and to the oscilloscope 51 to provide a display for the signal generated in the coil 12 upon precession of the polarized atomic particles in the formation.

As was described in the opening comments in this application, the polarization of the formation 11 will also entail polarization of magnetizable particles in the formation 11 and in the drilling fluid within the well bore 10. To compensate for the extraneous remnant fields which may be produced by the magnetization of the magnetizable particles within the formation and the drilling fluids, coil 12 may be energized with a current flowing in the opposite direction to the current that was employed in the polarization of the formation, thus producing a magnetic field opposite in polarity to that retained by the magnetized magnetizable particles. To provide this energization battery 36 is connected by conductors 31 and 35 to contacts 26 and 27 through switch 37 and adjustable resistor 38. Upon closure of the switch 37, the current supplied by battery 36 will flow through the coil 12 in a direction opposite to the initial polarization current to compensate, in the manner of the foregoing remarks, for the extraneous remnant fields persisting within the formation and drilling fluid.

FIGS. 2a through 2c illustrate the spin magnetic induction signals displayed upon the oscilloscope 51 upon the receipt of signals at the coil 12 from precessing protons within the formation 11, with FIG. 2a illustrating the rapidly decaying signal from the precession of protons within the formation in an inhomogeneous field indicating the rapid out-of-phasing due to the nonuniformity of the precession field for the protons of the formation. A signal of the type as shown in FIG. 2a is of little value for nuclear magnetic resonance well logging purposes due to its brevity making it difficult to detect.

In FIG. 2b is illustrated the desirable form of spin magnetic induction signal obtained from the precession of protons in an earth formation. This signal is derived from protons precessing in a substantially uniform field and is, in this case, the type of signal to be derived from earth formation protons precessing in a compensated precession field. In the presentation of FIG. 2b the compensating field, as has been previously defined, is adjusted to be just strong enough to cancel the extraneous remnant magnetic fields in the formation to provide the substantially uniform precession field.

FIG. 2c illustrates the spin magnetic induction signal derived from precessing protons when the compensating field employed is stronger than that required to just compensate for the inhomogeneities in the precession field due to the previously defined sources. To understand the signal illustrated by FIG. 2c, it is necessary to consider the case of the precession of at least two isolated protons precessing in fields of different strengths. As has been previously indicated, the rate of precession, and therefore the frequency of signal from each proton produced in a coil of the type of coil 12, is dependent upon the strength of the precession field; the stronger the field the faster the rate of precession. Considering now the two selected protons precessing in fields of different strength with their precessions beginning at the same time, it can easily be seen that after some determinable period of time the proton precessing in the stronger field will have gained a determinable distance of angular movement over the proton precessing in the weaker field. If these protons are spaced equal distances from the coil 12, the vectorial sum of their signals as generated in the coil 12 will start at a maximum when the two are exactly in phase and will gradually decrease to a zero signal when the two are 180° out-of-phase. As the protons continue to precess at the different rates, their individual signals will eventually be brought back into phase to reinforce each other and continue on to an out-of-phase condition, thus developing a sine wave type signal. By expanding the quantity of protons being considered to the order of their presence within the formations, it is easily understood how, with a randomly nonuniform field, the signal may take the pattern as shown in FIG. 2a as the protons gradually swing out of phase and into a randomly phased condition so that the vectorial sum of the individual signals produced by each proton in the coil 12 will accumulate to a zero signal. On the other hand, with the protons precessing all at the same rate, their signals will produce the sum as is illustrated in FIG. 2b. Returning then to the example of the two selected protons and considering the compensation of the nonuniform precession field by the provision of a current flowing in the opposite direction through the polarizing coil, it may be seen how the signal of FIG. 2b is derived.

The signal of FIG. 2c is likewise evident by considering the effect of the application of a compensating field some predetermined time after the termination of the polarizing current derived from the battery 39. If the two selected protons are considered when they have, by their different precession rates, become out-of-phase by some selected angle of rotation, such as 180°, and considering the application of a compensating field stronger than that which would be required to just compensate for the existing extraneous remnant fields, it can be seen that the proton precessing in the weakened field (weakened because the extraneous remnant field at the location of that selected proton is bucking or at least partially bucking the earth's magnetic field, thus reducing the earth's magnetic field) will now have its precession field strengthened to be greater than the earth's magnetic field by the extent of the overcompensation. Under this condition the proton with the strengthened field will have its rate of precession increased so that, with time, it will gain the angular distance it had lost with respect to the other selected proton. At the same time, the other of the selected protons previously precessing under a strengthened precession field (strengthened because the extraneous remnant field at the location of the selected proton is additive or at least partially additive to the earth's magnetic field, thus increasing the earth's magnetic field) will now have its precession field weakened to be weaker than the earth's magnetic field by the extent of the overcompensation. Under this condition, this other proton with its now weakened precession field will have its rate of precession decreased so that, with time, it will lose the previously gained angular distance it had gained with respect to the first selected proton or to a proton precessing at all times in the uniform magnetic field of the earth. Under these circumstances the gradually decreasing signal due to the vectorial combining of signals running out of phase will be reversed and the signal will be gradually increasing as the individual signals come closer and closer to an in-phase condition. The return to the in-phase condition is shown in FIG. 2c by the increase in signal strength at peak B. Continued application of the overcompensating field will merely carry the signal off into out-of-phasing in the opposite direction, causing the signal to gradually decline to a vectorial zero condition.

As has been previously explained, the most desirable condition is to provide a compensating field which will just eliminate the effect of the extraneous remnant field in the formation. The determination of this just-compensating field may be derived from an observation of the effects of the overcompensating field as illustrated in FIG. 2c. By making a permanent record of the pattern as shown in FIG. 2c from the face of the oscilloscope 51 or through the employment of a recording oscillograph, information may be derived which may be applied to the formula as follows:

$$\frac{\text{New Compensating Field}}{\text{First Compensating Field}} = \frac{\text{Time from application of first compensating field to observed envelope maximum (peak B)}}{\text{Time from beginning of precession period to appearance of observed envelope maximum (peak B)}}$$

to indicate the strength of the new compensating field. In the above formula, the first compensating field is the amount of current or a numerical adjustment of the resistor 38 to provide the overcompensated pattern of FIG. 2c; the time from application of first compensating field to observed envelope maximum (peak B) may be measured on the pattern of FIG. 2c as the time from the reversal of the slope of the envelope pattern to the maximum at peak B; the time from beginning of precession period to appearance of the observed envelope maximum (peake B) is easily determined from the pattern of FIG. 2c as a straight axial measurement of distance from the beginning of the signal at point A to the observation of the peak B. The operation of an experiment with the method of the present invention employing an overcompensating field may thus be employed to determine the precise compensating field required to just compensate for the extraneous remnant fields produced by the magnetizable materials in the formation 11 and in the drilling fluids within the well bore.

The determination of the exactly equal and opposite compensating field may also be accomplished by applying the overcompensating field at a different time from that described in the foregoing paragraph. In this alternative method, the overcompensating field is applied at precisely the same time that the protons are allowed to begin precession in the precession field. The application of the overcompensating field at the beginning of the precession period causes certain of the protons in the formation to be driven into an out-of-phase condition by the fact that the overcompensating field will be additive with the precession field in some areas and bucking to the field in others. Upon the removal of the overcompensating field, the protons within the formation will then be subjected to a precession field that will be the resultant of the earth's magnetic field within the formation and the extraneous remnant field produced by the magnetization of the magnetizable materials within the earth formation and the well bore. The overcompensating field, being opposite in direction and greater in strength than the extraneous remnant field, will have carried the protons out of phase in one direction, and the precession of these protons under the resultant precession field of the earth's field and the extraneous remnant field will tend to carry the protons out-of-phase in the opposite direction. The result is that the protons will be gradually returned to an in-phase condition and a chart of the spin magnetic induction signal will be as is indicated in FIG. 4. The spin magnetic induction signal will indicate a peak at point C where the protons have returned to an in-phase condition and from which there will be the gradual signal decline to an out-of-phase condition.

Figure 5B:
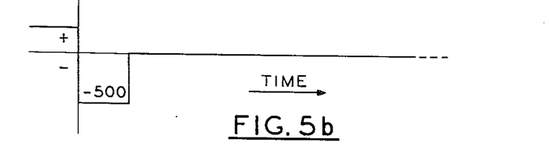
Figure 5C:
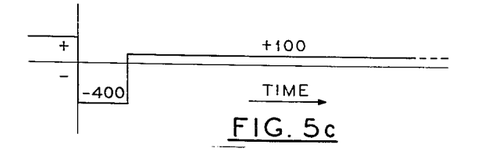
FIG. 5c illustrates the resultant precession field produced by the application of the energization illustrated in FIG. 5b.

The alternative method of the preceding paragraph may be used to determine information concerning the strength of the extraneous remnant field. To determine this, an overcompensating field may be applied at the beginning of the period of precession for a predetermined period of time and then the pattern of the precession signal may be observed to determine the time for the occurrence of a subsequent signal maximum when the protons have returned to an in-phase condition. An example of this method is shown in FIGS. 5a through 5c wherein for a first 10 millisecond period an overcompensating field of minus 500 units is applied to rapidly carry the protons into an out-of-phase condition. In the figure as illustrated the extraneous remnant field in the formation is of the strength of 100 units, thus making the resultant initial overcompensating field a strength of minus 400 units. The ratios of the overcompensating field to the extraneous remnant field are then of the order of minus 4 to plus 1, so that it will take four times as long with the plus field, the extraneous remnant field, to return the protons to their initial phased condition than it took to carry them out of phase. The overcompensating field was applied as shown in FIG. 5b for a period of 10 milliseconds and, applying the ratio of 4:1, the return to an in-phase condition should occur 40 milliseconds later or at the point of the 50 millisecond position on the spin magnetic induction signal envelope pattern of FIG. 5a. Applying the information that may be derived from a presentation of the type of FIG. 5a through 5c to a situation where the extraneous remanant field is unknown but where the time for application and the strength of the overcompensating field is known, the extraneous remnant field may then be determined and a spin magnetic induction signal operation may be performed, employing the exact compensating field necessary to produce a signal of the type illustrated in FIG. 2b.

In FIG. 6 is illustrated an alternative form for a portion of the uphole components of the apparatus of the present invention. With the apparatus of FIG. 6 a relaxation field may be applied to the polarized protons after the polarization field has been applied to bring the protons of the atomic particles within the formation 11 to a desired polarization condition. To accomplish this relaxation polarization, the battery 36 is replaced by a pair of back-to-back batteries 55 and 56, with battery 56 performing the function of the compensation battery 36 in FIG. 1 and battery 55 connected in the same polarity as battery 39 to provide a somewhat smaller polarization current for the relaxation field. A switch 57 is provided to connect conductor 31 to either battery 55 or 56, and a resistor 58 is provided across the back-to-back combination of batteries 55 and 56 to provide a voltage pickoff for the desired polarization current. Switch 57 is provided with a pair of contacts 59 and 61 with contact 59 connected to slider 62 and contact 61 connected to slider 63 to provide respective adjustments for the relaxation field and the compensating field. Switch 57 is operable to either of its extreme positions and is provided with a central stop for elimination of both the relaxation field and the compensating field voltages.

Figure 3A:
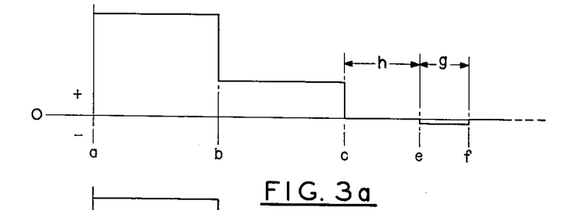
FIGS. 3a and 3b illustrate representative energization curves for the electromagnetic coil of the logging sonde of FIG. 1.
Figures 3B, 4, 5A, 6:
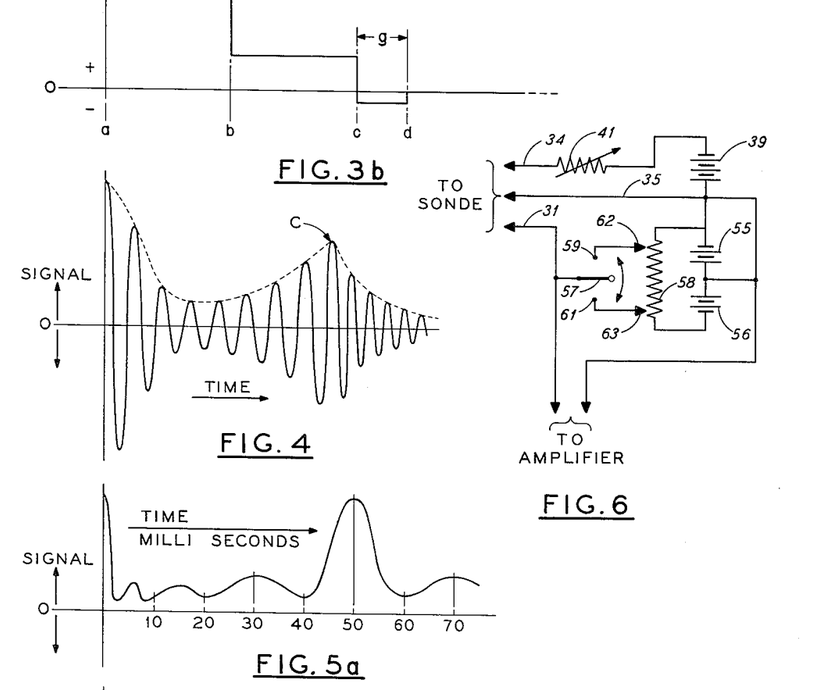
FIG. 4 is a spin magnetic induction signal, in chart form, derived from precessing protons with operation of the logging tool of FIG. 1 in an alternative method for establishing the overcompensated precession field.
FIG. 5a is a representation of the envelope of a spin magnetic induction signal derived from precessing protons in an overcompensated precession field in accordance with one method of the present invention.
FIG. 6 is an alternative form of the circuitry for energization of the logging sonde for performing the methods of the present invention.

The circuitry of FIG. 6 is provided to produce a polarization pattern as illustrated in FIGS. 3a and 3b. In these figures the period between a and b is the polarization period for the atomic particles within the earth formation. The period between b and c is the relaxation field and at point c the polarization and relaxation are terminated to permit the protons to precess under the desirably uniform earth's magnetic field. The negative parts of the chart for periods g indicate the compensating field as applied in FIG. 3a at e sometime after the period of precession, and in FIG. 3b at c immediately at the time precession is begun. The amplitudes of the polarization, relaxation and compensation fields are shown out of proportion in FIGS. 3a and 3b to permit all fields to be shown on the charts. It should be understood that the strength of these fields is of the order of 100 units for polarization, 10 units for relaxation, and 1 unit for compensation.

Figures 7, 8A, 8B, 9:
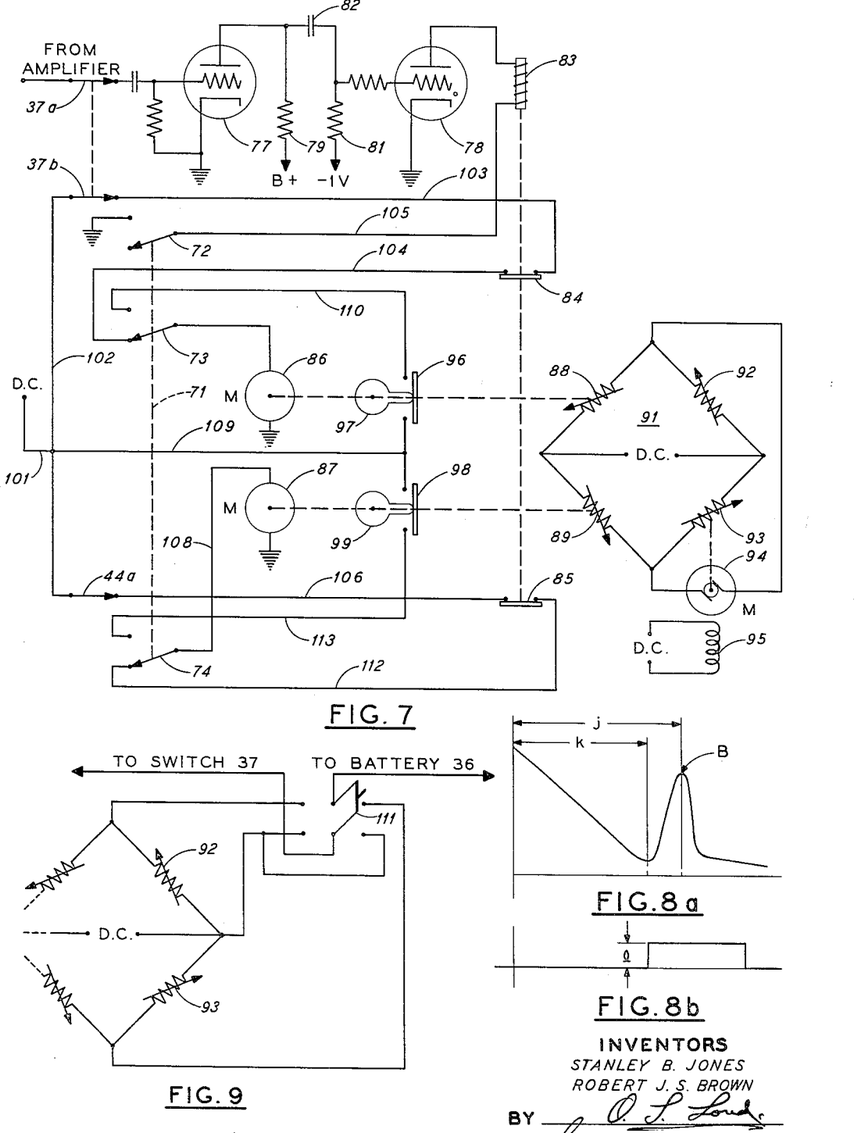
FIG. 7 is a schematic drawing of a circuit for automatically solving an equation for the strength of the compensating field to be used with the apparatus of the present invention.
FIGS. 8a and 8b illustrate a representative spin magnetic induction signal and a chart of energization indicating the quantities applied to the circuit of FIG. 7 for solution of the equation.
FIG. 9 is a schematic circuit diagram for a modification of FIG. 7 whereby a determined circuit value may be automatically added to the circuit of FIG. 1.

FIG. 7 illustrates a schematic diagram of an apparatus for automatically accomplishing the method of the present invention. The apparatus is designed to solve the equation stated in a preceding paragraph by which the just compensating field may be determined. The apparatus of FIG. 7 is to be energized from information derived from the waveforms as shown in FIGS 8a and 8b, these being the envelope pattern of a spin magnetic induction signal of the type shown in FIG. 2c derived from the application of an overcompensating field during the precession of protons within an earth formation and having an energization as shown in FIG. 8b. The envelope pattern of FIG. 8a may be supplied from the amplifier 47 by removing the modulation of the high frequency precessional signal of the precessing protons. The pattern of FIG. 8b is established by a mechanical adjustment of a resistor (resistor 38 in FIG. 1) and is the measure of the voltage applied to the coil 12 during the period of compensation.

In the schematic diagram of FIG. 7, a master switch 71 having a plurality of mechanically interconnected operating switch blades 72, 73 and 74 provides initial control for energization of a plurality of motors, and an electronically controlled solenoid is operated to perform the automatic solution to the previously defined equation. The blades 72, 73 and 74 are mechanically connected together with the down position corresponding to On and the up position corresponding to Off. The equation, being a ratio between two compensating voltages and two time periods, is solved by applying values proportional to these parameters to the legs of a Wheatstone bridge, and an unbalance in the Wheatstone bridge is employed to rebalance the bridge to provide the solution to the equation. An electronic control circuit is provided at 76 comprising a vacuum tube 77 and a thyratron tube 78 with a resistance coupling circuit including resistors 79 and 81 and a capacitor 82. Current flow through the thyratron 78 actuates a solenoid 83 having a pair of bridging contacts 84 and 85 in the energization circuits for a pair of motors 86 and 87, respectively. The motors 86 and 87 are adapted to drive adjustable potentiometers 88 and 89 in the Wheatstone bridge circuit 91. The bridge circuit also includes adjustable resistors 92 and 93, with resistor 92 adapted to be manually adjusted and resistor 93 adapted to be automatically adjusted by a motor 94 having its field 95 energized from a D.C. source and the unbalance appearing within the bridge 91 applied to the commutator.

Both of the motors 86 and 87 are adapted to be returned to a zero adjustment for the potentiometers 88 and 89 when the master switch 71 is turned to an Off position, this being accomplished, in the case of motor 86, by a cam-operated bridging contact 96 in series with the voltage supplied to the motor 86 and operated by a cam 97 mechanically driven by the shaft of the motor 86. A similar bridging contact 98 operated by cam 99 is provided for the zero positioning circuit of motor 87.

In operation the electronic control circuit 76 is adapted to sense the swing of the voltage waveform at previously identified point B from a positively sloping voltage to a negatively sloping voltage. This swing in the voltage is the termination point for time period indicated by letters j and k on FIG. 8a, both of which are terms of the equation to be solved. It should be evident that if a constant speed motor, such as a synchronous motor, is energized for the periods j and k, it will have produced an angular rotation proportional to these time quantities. The initiation point of term j is established by the termination of the polarization or relaxation field in the operation of the logging sonde of FIG. 1, and the termination point for the term k is established by the initiation of the compensation field in the operation of the logging sonde. These two initiation points are determined by the operation of switch 44 and switch 37, respectively, of FIG. 1.

Applying the pattern of the modulation of FIG. 8a to the electronic control circuit 76 of FIG. 7, it may be seen that the positive swing over the period k of the FIG. 8a is applied to the control grid of the vacuum tube 77 through contacts 37a of switch 37 of FIG. 1. Tube 77 is biased in a manner, not herein shown, to be normally conducting with this conduction increasing with the application of the signal over the period $k$. The increased conduction through tube 77 causes an increasing charge to appear on capacitor 82 and a voltage drop to appear across resistor 81, thereby applying a potential to the control grid of the thyratron 78, insuring that the thyratron will not conduct. The control grid of the thyratron 78 has a normally negative voltage with respect to its cathode, as is indicated by the minus 1 volt potential below resistor 81. In this manner the thyratron cannot conduct until the control grid has been driven in a positive direction. As soon as the waveform over the period $k$ has attained its maximum peak and begins its negative slope after peak B, capacitor 82 will begin to discharge, causing current to flow through resistor 81 and a voltage drop to appear across the resistor 81, applying a positive potential to the control grid of the thyratron 78. With proper selection and adjustment of the circuit components for the thyratron 78, the tube will conduct instantaneously upon this reversal of the control current through resistor 81, and this conduction current will flow through the windings of solenoid 83 to actuate the solenoid. Actuation of the solenoid 83 causes movement of the bridging contacts 84 and 85 in the energization circuits of motors 86 and 87 to remove the power to these timing devices.

In the manner of the preceding paragraph, motor 86 has been energized from the D.C. source at 101 through conductor 102, contacts 37b of switch 37, conductor 103, bridging contacts 84, conductor 104, switch blade 72, and conductor 105 to the motor 86. The motor therefore has been operated during the period that switch 37 of FIG. 1 is closed and until the peak has been obtained in the envelope pattern at peak B, and for this period the potentiometer 88 has been adjusted to correspond to the angular rotation of the motor 86.

Upon termination of the polarization current through the coil 12, the contacts 44a of switch 44 (FIG. 1) have been closed and motor 87 has been energized through conductor 106, bridging contact 85, conductor 107, switch blade 74, and conductor 108. For the period of energization of the motor 87, potentiometer 89 has been adjusted to correspond to the interval $j$ in the envelope pattern of FIG. 8a.

The remaining known quantity for the equation is mechanically adjusted in potentiometer in accordance with the adjustment of resistor 38 of FIG. 1 and corresponds to the potential applied in the compensation current to produce the overcompensated waveform of FIG. 8a. The bridge 91 therefore has three of its legs adjusted to quantities of the equation and has applied across a pair of these legs a D.C. potential to establish current flow within the bridge in a well-known manner. Any unbalance in the bridge is sensed between the junction of potentiometers 88 and 92 and the junction of potentiometers 89 and 93; this unbalance, when occurring, is applied to the armature of motor 94 to provide energization for that motor. A D.C. potential is applied across the field 95 of the motor 94, and, upon the occurrence of an unbalance in the bridge establishing an armature current for the motor, the motor will be energized to adjust the potentiometer 93 to bring the bridge into balance. The direction of unbalance is sensed by the motor 94 and, with proper connection of the field and armature, the motor will bring the bridge into balance in either direction.

The apparatus of FIG. 7 through the employment of a Wheatstone bridge has therefore established an automatic solution for the equation defining the voltage required to just compensate for the inhomogeneities in the precession field created by the magnetizable materials within the earth formation and the drilling fluids within the well bore. The adjustment of potentiometer 93 may either provide an indication of the adjustment necessary in the potentiometer 38 of FIG. 1 or may be directly connected into the control circuit of FIG. 1, as shown in FIG. 9 by operation of the double pole-double throw switch 111, to establish the desired compensating current.

After a solution has been performed in the bridge circuit, it is desirable to return the potentiometers 88 and 89 to zero adjustment in preparation for a later solution. For this purpose, bridging contacts 96 and 98 are provided in energization circuits for the motors 86 and 87. The energization for zero position is provided when the master switch 71 has been turned to an Off position where a D.C. potential is applied through conductor 109. The energization is provided through each of the bridging contacts 96 and 98 and, in the case of motor 86, through switch blade 73 and conductor 110 for energization of the motor 86, while, in the case of motor 87, the energization is through bridging contact 98, conductor 113, switch blade 74, and conductor 108 to motor 87. With the master switch 71 in the Off position, both motors 86 and 87 will be energized through their bridging contacts 96 and 98 until cams 97 and 99, respectively, have been rotated to the position where their eccentric peak engages the bridging contacts, as shown in FIG. 7, to open the circuit, thus removing the energization for the motors. In this manner the potentiometers 88 and 89 will be in a zero position when the bridge is again employed for the solution of the equation so that, with motors 86 and 87 operating as timing devices, the initial operation of the bridge will be from time zero.

While certain preferred embodiments of the invention have been specifically disclosed, it is understood that the invention is not limited thereto, as many variations will be readily apparent to those skilled in the art, and the invention is to be given its broadest possible interpretation within the terms of the following claims. It should be understood that where the term spin magnetic induction measurements is used, it is intended to include electron magnetism measurements, nuclear magnetism measurements, and measurements as above referred to as resonance and precession measurements.

We claim:

1. A method for detecting the precession of polarized atomic particles acted upon by a uniform magnetic field when said atomic particles are initially polarized in the presence of randomly distributed magnetically retentive material which comprises the steps of applying a polarizing field to said atomic particles and said magnetically retentive material, terminating said polarizing field after a predetermined period of time to allow said atomic particles to precess in a magnetic field at an angle to said polarizing field, applying a compensating field to said atomic particles and magnetically retentive material in a direction opposite to the polarizing field and in magnitude equal to the magnetic field produced by said magnetically retentive materials, and detecting the signal induced by the precession of said atomic particles while said compensating field is being applied.

2. The method of investigating the fluid content of an earth formation traversed by a well bore wherein randomly distributed magnetically retentive materials are present comprising the steps of applying a polarizing field from within said well bore for a predetermined period of time to polarize the protons within said fluids in and around said well bore, said polarizing field also magnetizing said magnetically retentive materials to establish locally retained magnetic fields, modifying said polarizing field to permit precession of said protons under a second magnetic field, applying a compensating magnetic field to said precessing protons opposite in polarity to said polarizing field for a period of time and sufficient in magnitude to compensate for said locally retained fields in and around said well bore so that said precession of said protons may continue in phase for a detectable relaxation period, and detecting said precession while said compensating field is applied to indicate the presence of fluids within the earth formation traversed by said well bore.

3. The method of detecting atomic precession of fluids in an earth formation traversed by a well bore wherein the earth formation has a tendency to sustain magnetic field inhomogeneities induced by the effect of the magnetic field of a polarizing coil on randomly distributed magnetically retentive material in and around said well bore comprising the steps of applying said polarizing magnetic field to the protons of said fluids in said earth formation, terminating said polarizing magnetic field, applying a compensating magnetic field to said fluids in said earth formation in a direction opposite to the magnetic field sustained by said magnetically retentive materials, and then detecting the signal induced by the precession of said protons in the magnetic field within said earth formation and constituting the earth's magnetic field and said compensating magnetic field.

4. The method of determining the magnetic field required to compensate for unavoidably created magnetic inhomogeneities of a magnetic field in and around a well bore penetrating an earth formation which comprises passing a first current through an electromagnetic coil within said well bore to establish a magnetic field for polarizing atomic particles within said earth formation penetrated by said well bore, modifying said first current to permit said polarized atomic particles to precess in a different magnetic field including said inhomogeneities, applying a reverse current through said electromagnetic coil for a predetermined period of time and of apposite polarity to said first current to produce a magnetic field in a direction opposite to said polarizing field and said inhomogeneities, detecting the period of time required after application of said reverse current to produce a surge in the precession signal from said polarized atomic particles, and correlating said detected time and applied reverse current to establish reverse current flow required to produce a magnetic field to just compensate for said magnetic inhomogeneities within said well bore and earth formation.

5. The method of detecting the precession of protons in fluids of an earth formation traversed by a bore hole when randomly distributed magnetically retentive materials are present in the bore hole and the earth formation which comprises applying a magnetic field to polarize the protons in the fluids within the bore hole and the adjacent earth formation for a predetermined time and causing magnetization of said magnetically retentive particles, modifying said polarizing field to permit said protons to precess in the earth's magnetic field within said well bore and earth formation, applying another field opposite in direction to said polarizing field for a period of time at least partially coextensive in time with said precession of said protons, the magnitude of said other field being predetermined to compensate for inhomogeneities in the earth's magnetic field due to said magnetically retentive materials through the volume including said well bore and earth formation wherein said protons are precessing, and then detecting the signal induced by said precession of said protons.

6. In the method of detecting the precession of protons in fluids of an earth formation traversed by a bore hole when magnetically retentive particles are present in the bore hole and the earth formation wherein a magnetic field is applied for a predetermined time to polarize the protons in the bore hole and the adjacent earth formation and to magnetize said magnetically retentive particles, then a relaxation field is applied to the protons in the fluids within said bore hole and the adjacent earth formation, said polarization and relaxation fields being then modified to permit said protons to begin in-phase precession in the earth's magnetic field, the additional steps of applying a first compensating field opposite in direction to said polarization and relaxation fields for a period of time at least partially coextensive with said precession of said protons, the magnitude of said compensating field being predetermined to more than compensate for inhomogeneities in said earth's magnetic field due to said magnetically retentive materials in the said well bore and earth formation wherein said protons are precessing, detecting the amplitude and wave form of the signal induced by the precession of said protons, correlating said detected amplitude and wave form of said signal with the time of application and magnitude of said compensating field, establishing from said correlation the compensating field required to completely compensate said earth's magnetic field for the effects of magnetized magnetically retentive particles present in said bore hole and the earth formation, and repeating said polarization, relaxation and precession steps with said established compensating field applied while said protons are precessing.

7. The method of extending the in-phase precession time of precessing protons in fluids within an earth formation having randomly distributed magnetically retentive material therein tending to sustain extraneous remnant fields within said formation which constitutes applying a magnetic field to polarize said protons and magnetically retentive material within said earth formation, modifying said field to permit said protons to precess in the earth's magnetic field, and applying a compensating magnetic field after said polarizing field has been modified and while said protons are precessing, said compensating field being opposite in polarity to and substantially equal to the extraneous remnant fields within said earth formation produced by the magnetization by said magnetically retentive materials.

8. The method for determining the magnitude of compensating field required in a spin magnetic induction well logging measurement on an earth formation penetrated by a well bore to compensate for magnetic field inhomogeneities induced by the effect of the magnetic field of a polarizing coil on randomly distributed magnetically retentive material in and around said well bore and earth formation comprising the steps of applying a first magnetic field having a spatially non-uniform flux pattern for polarizing atomic particles of fluids within said well bore and the earth formation, allowing the atomic particles of said fluids to precess in a second magnetic field until certain of said precessing particles have attained an out-of-phase relationship with other precessing particles, applying a third magnetic field to said fluids within said well bore and earth formation having a polarity opposite to said polarizing field and having a predetermined magnitude and creating a flux pattern in the opposite direction with respect to the flux pattern of said first magnetic field, maintaining said third field until said out-of-phase protons have been returned to an in-phase relationship, detecting the period of time to return said protons to in-phase relationship, and correlating said detected time and magnitude of applied third magnetic field to establish the desired magnitude for said third magnetic field to just compensate said second field for said magnetic inhomogeneities within said well bore and earth formation.

9. The method of logging an earth formation traversed by a well bore by spin magnetic induction signals for determining the presence of oil and water in said formation wherein said earth formation includes randomly distributed magnetically retentive materials tending to sustain extraneous remnant fields within said formation and well bore comprising the steps of applying a first magnetic field having a spatially non-uniform flux pattern to polarize the protons of fluids in and around said well bore, modifying said polarizing field to permit precession of said protons under a second field condition until certain of said precessing protons have become out-of-phase with other precessing protons, while said protons are precessing, applying a third magnetic field of opposite polarity to said first magnetic field for a period of time and of a magnitude to more than compensate for said extraneous remnant fields sustained by said magnetically retentive materials so that said precession of said certain protons will be returned from out-of-phase relation to in-phase relation with said other protons, detecting the period of time required to accomplish said return to in-phase relation, correlating said time measurement and magnitude of said third magnetic field to establish the precise compensating field required for said third applied field, reapplying said polarizing field to repolarize the protons of said fluids in and around said well bore, modifying said reapplied polarizing field to permit precession of said protons under said second field condition, applying said established third magnetic field while said protons are precessing, and detecting the spin magnetic induction signal of said protons in said compensated field as an indication of the presence of oil and water in said formation.

10. The method of determining the magnetic field required to compensate for magnetic inhomogeneities in the earth's magnetic field in and around a well bore which comprises passing a first current through an electromagnetic coil within said well bore to establish a magnetic field for polarizing the protons of fluids within said earth formation penetrated by said well bore, modifying said first current to permit said polarized protons to begin in-phase precession in a different magnetic field including said inhomogeneities, applying a reversed current flow through said electromagnetic coil at least partially coextensive in time with said in-phase precession to produce a magnetic field in a direction opposite to said polarizing field and of greater strength than said inhomogeneities, detecting the period of time required after application of said reverse field to produce a surge in the precession signal from said polarized protons, and correlating from said detected time and reverse current flow to establish the reverse current flow required to produce a magnetic field to just compensate for said magnetic inhomogeneities within said well bore and earth formation.

11. In the method of detecting the precession of protons in fluids of an earth formation traversed by a bore hole when magnetically retentive particles are present in the bore hole and the earth formation wherein a magnetic field is applied to polarize the protons in the fluids within the bore hole and the adjacent earth formation for a predetermined time and causing magnetization of said magnetically retentive particles, said polarizing field then being modified to permit said protons to begin in-phase precession in the earth's magnetic field within said well bore and earth formation, the additional steps of applying another field opposite in direction to said polarizing field for a period of time at least coextensive in time with said in-phase precession of said protons, the magnitude of said other field being predetermined to more than compensate for local inhomogeneities in the earth's magnetic field due to said magnetically retentive materials in said well bore and earth formation wherein said protons are precessing, and then detecting a surge in the precession signal induced by said precessing protons, as a measure of the extent of inhomogeneities present in the earth's magnetic field due to said magnetization of said magnetically retentive particles.

12. The method for determining the magnitude of compensating field required in a spin magnetic induction well logging measurement of an earth formation penetrated by a well bore wherein the earth formation and well bore have a tendency to sustain magnetic field inhomogeneities due to randomly distributed magnetizable particles within said formation and well bore, comprising the steps of applying a first magnetic field having a spatially non-uniform flux pattern for polarizing atomic particles of fluids within said well bore and the earth formation, allowing the atomic particles of said fluids to precess in a second magnetic field until certain of said precessing particles have attained an out-of-phase relationship with other precessing particles, applying a third magnetic field to said fluids within said well bore and earth formation, said third magnetic field having a polarity opposite to said polarizing field and having a predetermined magnitude and creating a flux pattern in the opposite direction with respect to the flux pattern of said first magnetic field, maintaining said third field for a predetermined period of time, detecting the period of time to return said precessing protons to in-phase relationship, and correlating said detected time and third magnetic field magnitude to establish the desired magnitude for said third magnetic field to just compensate said second field for said magnetic inhomogeneities within said well bore and earth formation.

13. A method for establishing the magnitude of compensating field required in a spin magnetic induction well logging measurement of an earth formation penetrated by a well bore wherein the earth formation and well bore have a tendency to sustain magnetic field inhomogeneities due to randomly distributed magnetizable particles within said formation and well bore, comprising the steps of applying a first magnetic field having a spatially non-uniform flux pattern for polarizing atomic particles of fluids within said well bore and the earth formation, allowing the atomic particles of said fluids to precess in a second magnetic field until certain of said precessing particles have attained an out-of-phase relationship with other precessing particles, applying a third magnetic field to said fluids within said well bore and earth formation as said atomic particles begin said precession, said third magnetic field having a polarity opposite to said polarizing field and having a predetermined magnitude and creating a flux pattern in the opposite direction with respect to the flux pattern of said first magnetic field, maintaining said third field for a predetermined period of time, detecting the period of time to return said protons to in-phase relationship, and correlating said detected time and third magnetic field magnitude to establish the magnitude for said third magnetic field to just compensate said second field for said magnetic inhomogeneities within said well bore and earth formation.

14. The method of establishing the magnetic field required to compensate for unavoidably created magnetic inhomogeneities of a magnetic field in and around a well bore penetrating an earth formation which comprises passing a first current through an electromagnetic coil within said well bore to establish a magnetic field for polarizing the atomic particles within said earth formation penetrated by said well bore, modifying said first current to permit said polarized atomic particles to precess in a different magnetic field including said inhomogeneities, applying a reverse current through said electromagnetic coil to produce a magnetic field in a direction opposite to said polarizing field and said inhomogeneities, initiating operation of a constant velocity adjusting device to adjust a first circuit component from zero in an increasing direction from the time of modification of said polarizing field, initiating operation of a second constant velocity adjusting device to adjust a second circuit component from zero in a positive direction from the time of application of said reversed current, adjusting a third circuit component in accordance with the strength of said applied reverse current, detecting the period of time required after the application of said reversed current to produce a surge in the precession signal from said polarized atomic particles, applying said detected signal to a switching means to terminate operation of said first and second constant velocity adjusting devices, connecting said first, second and third circuit components in a bridge circuit and detecting a condition of unbalance in said circuit, energizing a third adjustment device to adjust a fourth circuit component in accordance with said unbalance, connecting said fourth circuit component into said bridge circuit to bring said bridge circuit into balance, and adjusting said reverse current in accordance with adjustment of said fourth circuit component to establish the magnetic field required to just compensate for said magnetic inhomogeneities within said well bore and earth formation.

15. The method of logging an earth formation traversed by a well bore by spin magnetic induction signals for determining the presence of oil and water in said formation wherein said earth formation includes randomly distributed magnetically retentive materials tending to sustain extraneous remnant fields within said formation and well bore comprising the steps of applying a first magnetic field having a spatially non-uniform flux pattern to polarize the protons of fluids in and around said well bore, modifying said polarizing field to permit precession of said protons under a second field condition until certain of said precessing protons have become out-of-phase with other precessing protons, while said protons are precessing, applying a third magnetic field of oposite polarity to said first magnetic field for a period of time and of a magnitude to more than compensate for said extraneous remnant fields sustained by said magnetically retentive materials so that said precession of said certain protons will be returned from out-of-phase relation to in-phase relation with said other protons, detecting the period of time required to accomplish said return to in-phase relation, correlating said time measurement and third magnetic field magnitude to establish the precise compensating field required for said third applied field, applying to said polarizing coil a reverse current of a magnitude to produce said established compensating field, reapplying said polarizing field to repolarize the protons of said fluids in and around said well bore, modifying said reapplied polarizing field to permit precession of said protons under said second field condition and said compensating field, and detecting the spin magnetic induction signal of said protons as an indication of the presence of oil and water in said formation.

16. A well logging tool for logging an earth formation penetrated by a well bore comprising a logging sonde, means for supporting and for moving said sonde into and out of said well bore, an electromagnetic coil supported on said sonde, an electromagnetically operated solenoid switching device, a plurality of sources of power of opposite polarity connected to said electromagnetic coil through said solenoid switching device, and visual display means connected to said electromagnetic coil through said solenoid switching device, said solenoid switching device being connected to be energized from a portion of said power source to connect and disconnect said electromagnetic coil to one of said plurality of power sources to polarize the atomic particles of said earth formation penetrated by said well bore, said visual display means being connectable to said electromagnetic coil by said switching device after said coil has been disconnected from said one of said plurality of power sources, and means for connecting a power source of polarity opposite to said polarizing power source through said electromagnetic coil at least partially coextensively with the connection of said display device to said electromagnetic coil whereby spin magnetic induction signals may be derived from said atomic particles while said particles are precessing in a compensated precession field.

17. An apparatus for automatically determining the magnitude of a compensating field required in a spin magnetic induction well logging measurement of an earth formation penetrated by a well bore wherein the earth formation and well bore have a tendency to sustain magnetic field inhomogeneities due to randomly distributed magnetizable particles within said formation and well bore comprising means for applying a first magnetic field having a spatial non-uniform flux pattern for polarizing atomic particles of fluids within said well bore and earth formation, means for terminating said first magnetic field to allow the atomic particles of said fluids to precess in a second magnetic field until certain of said precessing atomic particles have attained an out-of-phase relationship with other precessing atomic particles, means for applying a third magnetic field to said fluids within said well bore and earth formation having a polarity opposite to said polarizing field, said third magnetic field having a predetermined magnitude and creating a flux pattern in the opposite direction with respect to the flux pattern of said first magnetic field, means for detecting a spin magnetic induction signal derived from said precessing atomic particles, a bridge circuit including four circuit components, means for energizing a first constant velocity adjusting means for adjusting a first of said circuit components from zero in a positive direction after modification of said first magnetic field, means for energizing a second constant velocity adjusting means for adjusting a second circuit component from zero in a positive direction from the time of application of said third magnetic field, means for adjusting a third of said circuit components in accordance with the magnitude of said third magnetic field, means for detecting a surge in the spin magnetic induction signal from said precessing protons while said third magnetic field is maintained, means for terminating operation of said first and second constant velocity adjusting means upon the detection of a surge in the spin magnetic induction signal from said precessing protons, means for sensing an unbalance in said bridge circuit, and means for adjusting the fourth circuit component in accordance with said unbalance to bring said bridge circuit into electrical balance whereby the determination of the magnitude of said compensating field is derived from the adjustment of said fourth circuit component.

18. In the apparatus defined in claim 17, the additional means comprising a switching device for connecting said third circuit component in the adjustment circuit for said third magnetic field and for replacing said third circuit component with said fourth circuit component to adjust said third magnetic field in accordance with the determination of the magnitude of said compensating field.

References Cited in the file of this patent

Varian: German application 1,015,954, printed Sept. 19, 1957 (KL21g) (5 pp. spec.; 3 shts. dwg.).

Bloom et al.: Physical Review, vol. 93, No. 4, Feb. 15, 1954, page 941 (paragraph A8).

Brown et al.: Journal of Petroleum Technology, vol. 8, November 1956, pp. 262–264.